United States Patent
Zhao

(10) Patent No.: US 10,153,565 B2
(45) Date of Patent: Dec. 11, 2018

(54) BATTERY DISTRIBUTION UNIT

(71) Applicant: TYCO ELECTRONICS CORPORATION, Berwyn, PA (US)

(72) Inventor: Weiping Zhao, Superior Township, MI (US)

(73) Assignee: TE CONNECTIVITY CORPORATION, Berwyn, PA (US)

( * ) Notice: Subject to any disclaimer, the term of this patent is extended or adjusted under 35 U.S.C. 154(b) by 0 days.

(21) Appl. No.: 15/346,095

(22) Filed: Nov. 8, 2016

(65) Prior Publication Data

US 2017/0054230 A1    Feb. 23, 2017

Related U.S. Application Data

(62) Division of application No. 13/803,703, filed on Mar. 14, 2013, now abandoned.

(51) Int. Cl.
| | |
|---|---|
| *H02B 1/20* | (2006.01) |
| *H02B 1/26* | (2006.01) |
| *H01R 9/22* | (2006.01) |
| *B60R 16/023* | (2006.01) |
| *H01R 11/09* | (2006.01) |
| *H01R 31/08* | (2006.01) |
| *H01R 13/11* | (2006.01) |
| *H01H 85/02* | (2006.01) |

(52) U.S. Cl.
CPC ......... *H01R 9/226* (2013.01); *B60R 16/0238* (2013.01); *H01H 85/0241* (2013.01); *H01R 11/09* (2013.01); *H02B 1/207* (2013.01); *H01H 2085/025* (2013.01); *H01R 13/113* (2013.01); *H01R 31/08* (2013.01); *H01R 2201/26* (2013.01)

(58) Field of Classification Search
None
See application file for complete search history.

(56) References Cited

U.S. PATENT DOCUMENTS

| | | | |
|---|---|---|---|
| 5,057,026 A | 10/1991 | Sawai et al. | |
| 6,168,456 B1 * | 1/2001 | Saka | H01R 4/2416 |
| | | | 439/404 |

(Continued)

FOREIGN PATENT DOCUMENTS

| | | |
|---|---|---|
| CN | 1257333 A | 6/2000 |
| DE | 103 40 850 A1 | 4/2004 |

(Continued)

OTHER PUBLICATIONS

International Search Report, International Application No. PCT/US2013/078223, International Filing Date, Dec. 30, 2013.

*Primary Examiner* — Courtney Smith

(57) ABSTRACT

A battery distribution unit (BDU) for holding a first electronic device having a first blade terminal extending therefrom and a second electronic device having a second blade terminal extending therefrom includes a BDU housing, a strip busbar received in the BDU housing, and first and second cross terminals received in the BDU housing. The first cross terminal receives the strip busbar at a first end thereof and is configured to receive the first blade terminal at a second end thereof. The second cross terminal receives the strip busbar at a first end thereof and is configured to receive the second blade terminal at a second end thereof.

20 Claims, 7 Drawing Sheets

(56) References Cited

U.S. PATENT DOCUMENTS

| | | | |
|---|---|---|---|
| 6,447,325 B1* | 9/2002 | Yamane | H01R 9/226 439/404 |
| 7,283,366 B2* | 10/2007 | Yamashita | B60R 16/0238 165/80.1 |
| 8,913,371 B2* | 12/2014 | Depp | H01H 50/021 361/626 |
| 2005/0231897 A1 | 10/2005 | Yamashita | |
| 2008/0180884 A1* | 7/2008 | Parrish | B60R 16/0238 361/624 |
| 2013/0000971 A1 | 1/2013 | Sakaki et al. | |

FOREIGN PATENT DOCUMENTS

| | | |
|---|---|---|
| DE | 103 06 979 A1 | 9/2004 |
| DE | 103 51 099 B3 | 8/2005 |
| DE | 10 2006 062022 A1 | 7/2008 |
| EP | 0 701 924 A2 | 3/1996 |
| EP | 0 994 639 A1 | 4/2000 |
| JP | S60 35911 A | 2/1985 |
| JP | H02 7718 U | 1/1990 |
| JP | 02 111213 A | 4/1990 |
| JP | 2008 086070 A | 4/2008 |

\* cited by examiner

BATTERY DISTRIBUTION UNIT

CROSS REFERENCE TO RELATED APPLICATIONS

This application is a divisional application of, and claims benefit to the filing date of, U.S. patent application Ser. No. 13/803,703, filed Mar. 14, 2013, titled BATTERY DISTRIBUTION UNIT which claims the benefit of U.S. Provisional Application No. 61/751,118 filed Jan. 10, 2013, titled BATTERY DISTRIBUTION UNIT, the subject matter of which is herein incorporated by reference in its entirety.

BACKGROUND OF THE INVENTION

The subject matter herein relates generally to battery distribution units (BDUs) for battery systems.

Batteries, such as those for electric vehicles or hybrid vehicles, typically include a plurality of cells grouped together as a battery pack. The battery pack includes a battery distribution unit that manages the power capacity and functionality of the battery pack. The battery distribution units are typically mounted inside a casing of the battery pack. The BDU includes many electric devices such as at least one power relay, at least one pre-charge relay, at least one pre-charge resistor, at least one Y-capacitor, at least one fuse, a current sensor, and other electric devices.

Conventional BDUs use bolt/nut connections, increasing the number of components within the BDU housing and increasing the assembly time. The size of the BDU is relatively large to accommodate the connections. The large number of parts increases the cost of the BDU. Other BDU designs utilize customized busbars, which are typically stamped and formed busbars having the busbar arranged horizontally with stamped blades formed 90° to extend vertically to mate with the devices. Bolt/nut connections may be utilized with such busbars. Other systems use box terminals that fit onto the blades. Conventional 12V fuse-relay boxes having customized busbars typically arrange the busbars on multiple (e.g. four) different layers, which increases the overall cost and package size of the 12V fuse relay box. The systems are complex and have many components. Such systems have no design flexibility to adapt to different orientations, available spaces and shapes. Such systems are also difficult to integrate with other connectors or devices. Additionally, for the customized busbar, the blade position tolerance is very difficulty to control. Sometimes, it may be difficult to accommodate for the blade orientation of the devices. Cost is a major disadvantage of such systems.

There is a need for a robust BDU, which is flexible in design and small in size for locating within the battery system. There is a need for a BDU capable of accommodating device location such as relays, fuses, resistor and the like.

BRIEF DESCRIPTION OF THE INVENTION

In one embodiment, a battery distribution unit (BDU) is provided for holding a first electronic device having a first blade terminal extending therefrom and a second electronic device having a second blade terminal extending therefrom. The BDU includes a BDU housing, a strip busbar received in the BDU housing, and first and second cross terminals received in the BDU housing. The first cross terminal receives the strip busbar at a first end thereof and is configured to receive the first blade terminal at a second end thereof. The second cross terminal receives the strip busbar at a first end thereof and is configured to receive the second blade terminal at a second end thereof.

Optionally, the strip busbar may include first and second broad sides extending a length of the strip busbar between first and second ends. The strip busbar may have a top edge and a bottom edge extending between the first and second ends. The strip busbar may have at least one bend along the length. Alternatively, the strip busbar may have no bends along the length. The strip busbar may include first and second broad sides extending a length of the strip busbar between first and second ends, and a top edge and a bottom edge extending between the first and second ends. The first and second cross terminals may be mounted to either of the first or second edges at any positions along the length. The first and second cross terminals may engage both the first and second broad sides at any positions along the length.

Optionally, the strip busbar may be formed from a metal coil strip cut to length and bent into a predetermined shape to electrically connect the first and second blade terminals via the first and second cross terminals. The strip busbar may have a rectangular cross section along an entire length thereof The first and second cross terminals have first ends and second ends. The first ends of the first and second cross terminals may include L-shaped wall segments arranged in four quadrants with the wall segments defining a cross shaped cavity configured to receive the strip busbar oriented in one direction or in perpendicular orientations. The second ends of first and second cross terminals may include L-shaped wall segments arranged in four quadrants with the wall segments defining a cross shaped cavity configured to receive the blade terminals of electric device in at least one orientation.

Optionally, the first and second cross terminals may each include a crossed shaped cavity having a first cavity segment and a second cavity segment perpendicular to and intersecting the first cavity segment. The first and second cross terminals may be coupled to the strip busbar at different orthogonal orientations by loading the strip busbar into the first cavity segment or into the second cavity segment of the corresponding first or second cross terminal. The first and second cross terminals may have open sides allowing the strip busbar to pass therethrough.

Optionally, electrical take offs may be connected to the strip busbars along any segment thereof The electrical take offs may be open sided terminals coupled to the strip busbars along either the top edge or the bottom edge. Wires terminated to the electrical take offs may extend to other electrical components within the BDU or outside of the BDU. The electrical take off may conduct power or may be used for voltage measuring. Optionally, blade contacts may be coupled to at least some of the blade terminals of the electronic devices. The blade contacts may be terminated to wires that are routed within the BDU and/or outside of the BDU.

Optionally, the BDU housing may include a channel and chambers opened to a channel. The strip busbar may be received in the channel and the first and second cross terminals may be received in corresponding chambers to mechanically and electrically connect to the strip busbar. The BDU may include a second strip busbar and a third cross terminal. The third cross terminal may receive the second strip busbar at a first end thereof and may receive a third blade terminal extending from the second electronic device such that both the first strip busbar and the second strip busbar are electrically connected to the second electronic device.

DETAILED DESCRIPTION OF THE INVENTION

Figure 1:
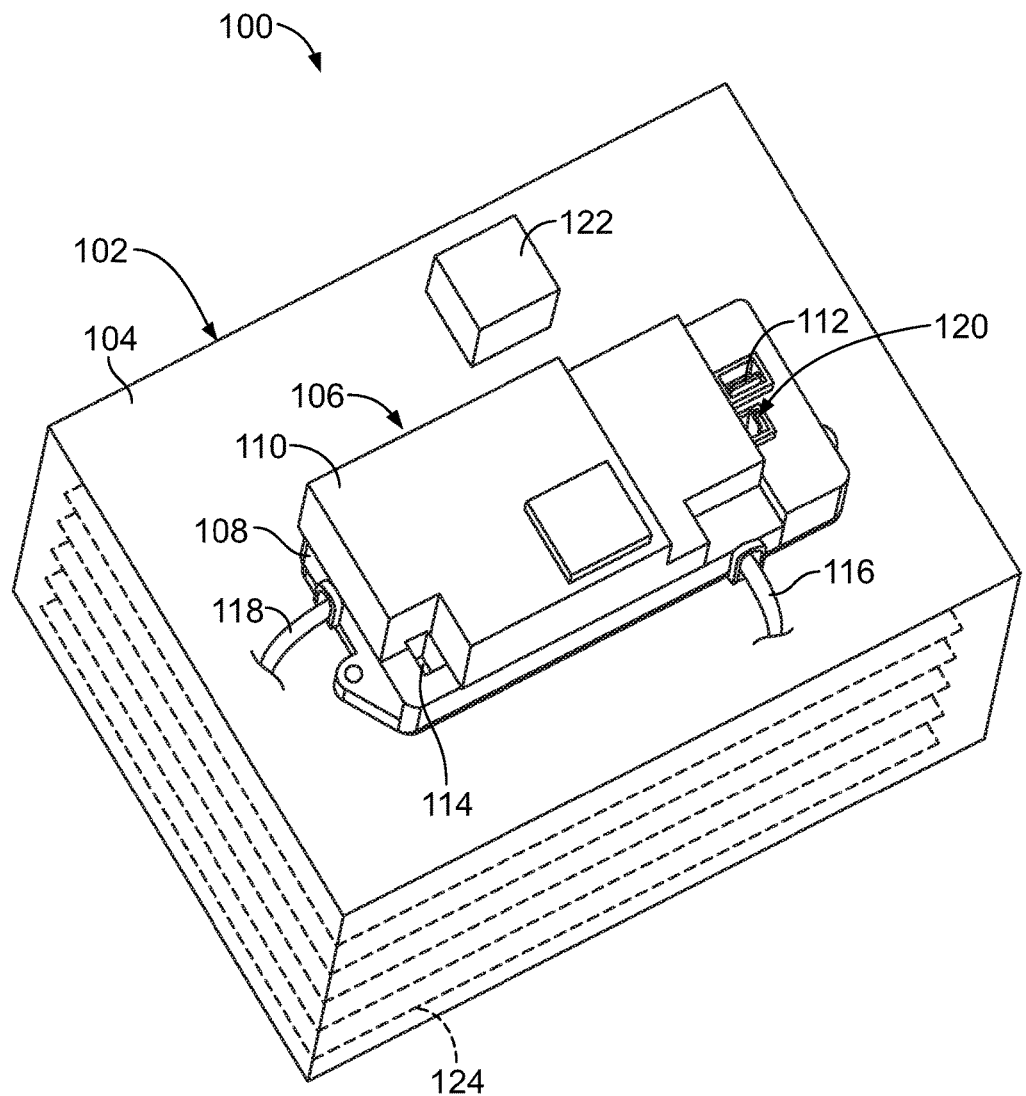
FIG. 1 illustrates a battery system having a battery distribution unit (BDU) formed in accordance with an exemplary embodiment.

FIG. 1 illustrates a battery system 100 having a battery distribution unit (BDU) 106 formed in accordance with an exemplary embodiment. The battery system 100 includes a battery pack 102 contained within an outer casing 104. The battery distribution unit (BDU) 106 is coupled to the battery pack 102. The battery pack 102 may be part of a high voltage energy storage system. For example, the battery pack 102 may be used in an automotive application, such as part of an electric vehicle or a hybrid electric vehicle.

The BDU 106 is used to manage the power capacity and functionality of the battery system 100, such as by measuring current and regulating power distribution of the battery pack 102. The battery system 100 may have both a high current power circuit and a low current power circuit, both electrically connected to the battery pack 102 through the BDU 106. The BDU 106 may monitor and/or control the operation of the components of the battery system 100. The BDU 106 may measure or react to the battery health of the battery pack 102. The BDU 106 may measure or react to the battery status of the battery pack 102. The BDU 106 may monitor for or react to overvoltage and/or low voltage situation with the battery pack 102. The BDU 106 may react due to the temperature changing of the battery pack 102. The BDU 106 may manage charging functions of the battery pack 102. The BDU 106 may have external connections and/or connectors, such as for attaching power terminals to the BDU 106 and/or the battery pack 102, for attaching sensors to the BDU 106, for communicating data to/from the BDU 106, and the like.

The BDU 106 may be contained within the outer casing 104 in other embodiments. Alternatively, the BDU 106 may be mounted directly to an exterior of the outer casing 104. The BDU 106 includes a BDU housing 108 and a cover 110 coupled to the BDU housing 108 for covering the components therein. In an exemplary embodiment, a positive battery terminal 112 and a negative battery terminal 114 may be accessible through the BDU housing 108 and/or cover 110 for external connection with the BDU 106. In an exemplary embodiment, high voltage wires 116 and/or low voltage wires 118 may extend from the BDU 106. A sensor connector 120 is accessible through the BDU housing 108 and/or cover 110 for external connection with one or more sensors of the BDU 106.

In an exemplary embodiment, the battery system 100 may include a manual service disconnect (MSD) 122 for disconnecting the power circuit of the battery system 100, such as for service. The MSD 122 may be connected directly to the outer casing 104. Alternatively, the MSD may be connected directly to the BDU 106. The MSD 122 is used to disconnect or open the power circuit of the battery system 100, such as during service or maintenance. For example, a disconnect plug of the MSD 122 may be disconnected and removed from a disconnect header of the MSD 122. The MSD 122 may include a high voltage interlock (HVIL) circuit to control the high current power circuit during opening and closing of the MSD 122.

In an exemplary embodiment, the battery pack 102 includes a plurality of battery cells 124 housed within the outer casing 104. The battery cells 124 may be any type of battery cells. For example, the battery cells 124 may be pouch battery cells or prismatic battery cells. Other types of battery cells may be used in alternative embodiments. Optionally, the battery cells 124 may be narrow plates arranged in a stacked configuration. Any number of battery cells 124 may be provided in the battery pack 102. Each of the battery cells 124 may be electrically connected to the BDU 106 through an appropriate electrical connection within the battery pack 102.

Figure 2:
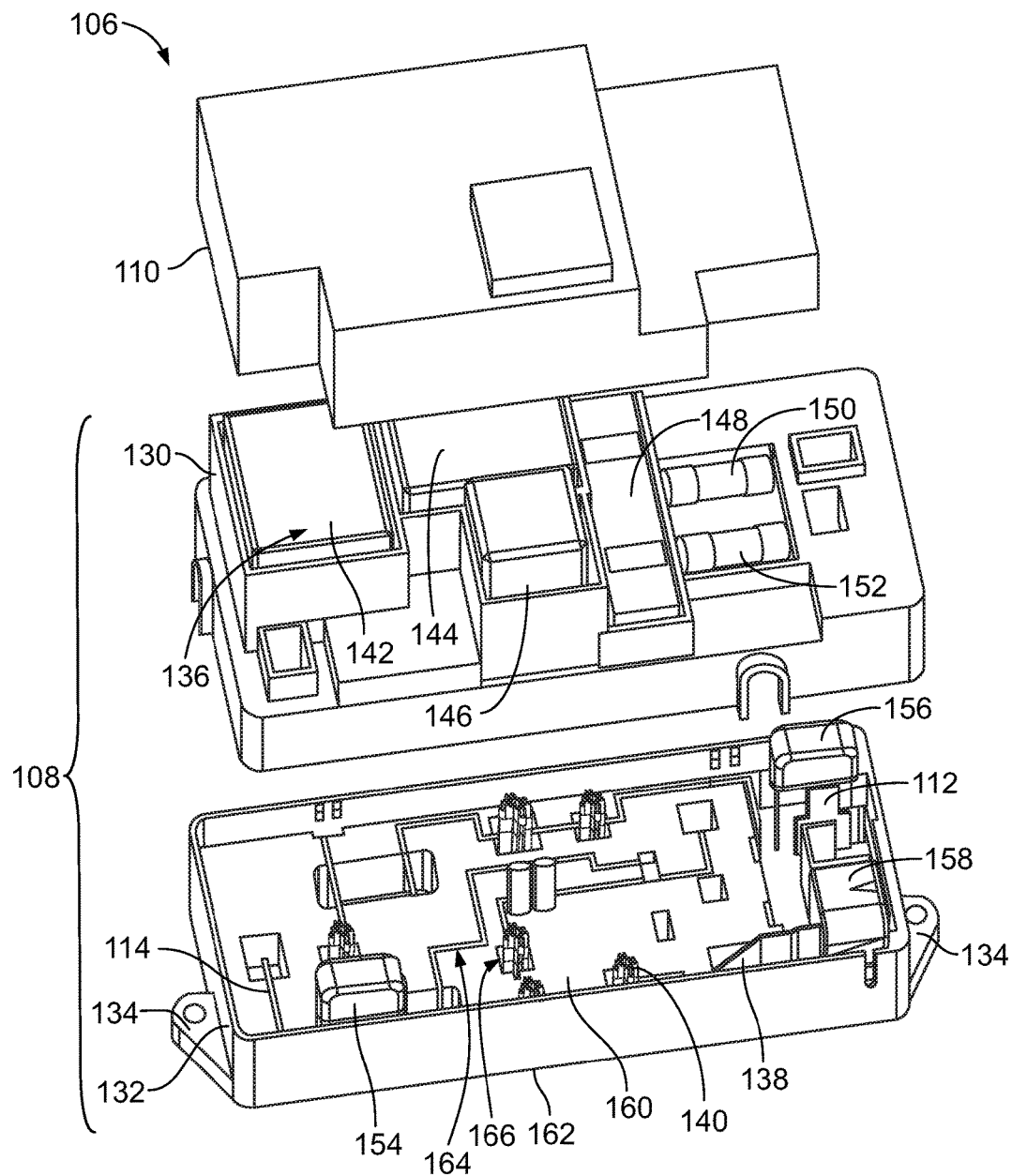
FIG. 2 is an exploded view of a battery distribution unit of the battery system formed in accordance with an exemplary embodiment.

FIG. 2 is an exploded view of the BDU 106 formed in accordance with an exemplary embodiment. In an exemplary embodiment, the BDU housing 108 is a two piece housing having an upper housing 130 and a lower housing 132. The upper housing 130 is configured to be coupled to the lower housing 132. The cover 110 is configured to be mounted to the upper housing 130. The lower housing 132 includes mounting flanges 134 for mounting the BDU 106 to the outer casing 104 (shown in FIG. 1), such as to an interior of the outer casing 104 or to an exterior of the outer casing 104. The BDU 106 may be mounted to the outer casing 104 such that the lower housing 132 is mounted to or is interior of the outer casing 104 and the upper housing 130 is facing out of the outer casing 104. Alternatively, the BDU 106 may be mounted to the outer casing 104 such that the upper housing 130 is interior of the outer casing 104 and the bottom of the lower housing 132 is facing out of the outer casing 104.

In an exemplary embodiment, the upper and lower housing 130, 132 are manufactured from a dielectric material, such as a plastic material. The upper housing 130 holds a plurality of electronic devices, generally shown at 136. The lower housing 132 holds a plurality of strip busbars 138 and cross terminals 140 used to electrically interconnect the electronic devices 136. When the upper housing 130 is coupled to the lower housing 132, the electronic devices 136 may be electrically connected to corresponding busbars 138 via corresponding cross terminals 140. Optionally, the lower housing 132 may hold one or more electronic devices 136. Optionally, the upper housing 130 may hold one or more strip busbars 138 and/or cross terminals 140.

Any type of electronic devices 136 may form part of the BDU 106 depending on the particular requirements of the battery system 100 (shown in FIG. 1). In the illustrated embodiment, the BDU 106 includes a pair of power relays 142, 144, a pre-charge relay 146, a pre-charge resister 148, a pair of fuses 150, 152, Y-capacitors 154, 156, a sensor 158 and the positive and negative battery terminals 112, 114. Other types of electronic devices 136 may be used in alternative embodiments. The positioning of the electronic devices 136 may have a layout designed to minimize the footprint of the BDU 106.

The strip busbars 138 define electrical paths between corresponding electronic devices 136. The strip busbar 138 can be easily routed within the lower housing 132 between the corresponding electronic devices 136. The strip busbars 138 and cross terminals 140 allow convenient and simple connections between the strip busbars 138 and the electronic devices 136. The cross terminals 140 allow the electronic devices 136 to be quickly plugged in or unplugged from the BDU 106. The cross terminals 140 eliminate some or all wired connections to the electronic devices 136, reducing assembly time of the BDU 106.

In an exemplary embodiment, the lower housing 132 includes a top 160 and a bottom 162. The lower housing 132 includes a plurality of channels 164 therein open at the top 160 and/or the bottom 162. The strip busbars 138 are loaded into corresponding channels 164. The channels 164 position and retain the strip busbars 138 and provide electrical isolation and prevent inadvertent touching of the strip busbars 138. The dielectric material of the housing 132 prevents shorting among conductive elements in the BDU 106. The channels 164 extend generally vertically within the lower housing 132 between the top 160 and the bottom 162. The strip busbars 138 are received in the channels 164 such that the strip busbars 138 extend generally vertically within the lower housing 132 between the top 160 and/or the bottom 162. In an exemplary embodiment, each of the strip busbars 138 are arranged at the same horizontal level and received at the same depth in the lower housing 132. For example, the strip busbars 138 are routed around each other but do not pass vertically above or below one another. Providing all of the strip busbars 138 at the same depth allows the lower housing 132, and thus the BDU 106, to have a low profile, saving valuable space in and around the battery system 100 and/or making the battery system 100 more compact. Not passing busbars above or below one another eliminates the need for providing adequate creepage distance between such busbars, which requires additional height for the lower housing 132. The cost and package size are reduced by such an arrangement.

The lower housing 132 includes a plurality of chambers 166 open to corresponding channels 164. The chambers 166 are open at the top 160 and/or the bottom 162. The chambers 166 receive corresponding cross terminal 140 therein. Optionally, the chambers 166 may be sized and shaped to hold the cross terminals 140 therein, such as by a friction fit or by using locking features. The chambers 166 may be sized and shaped to orient the cross terminals 140 relative to the lower housing 132 and the strip busbars 138 for termination thereto. For example, the cross terminals 140 may be plugged into the chambers 166 and terminated to the strip busbars 138 as the cross terminals 140 are plugged into the chambers 166. The cross terminals 140 are received in corresponding chambers 166 to mechanically and electrically connect to the corresponding strip busbars 138. The chambers 166 provide location, retention, alignment, orientation and mounting for the cross terminals 140. The chambers 166 provide insulation around the cross terminals 140 and provide electrical isolation and protection from inadvertent touching.

Figure 3:
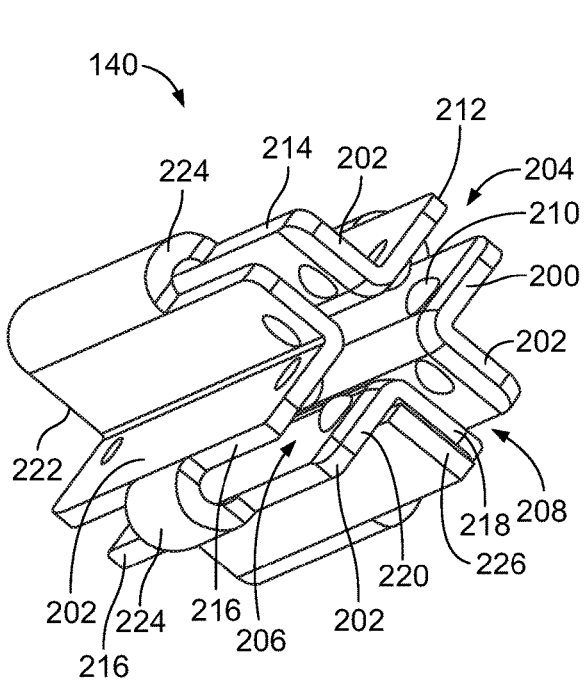
FIG. 3 is a bottom perspective view of a cross terminals of the battery distribution unit formed in accordance with an exemplary embodiment.
Figure 4:
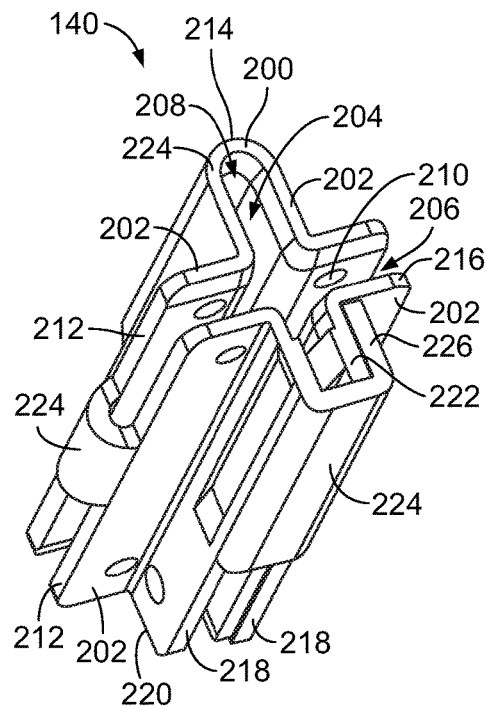
FIG. 4 is a perspective view of the cross terminal shown in FIG. 3.

FIG. 3 is a bottom perspective view of one of the cross terminals 140 formed in accordance with an exemplary embodiment. FIG. 4 is a perspective view of the cross terminal 140 shown in FIG. 3. The cross terminal 140 includes a stamped and formed body 200 formed into a cross-shape. The cross terminal 140 includes a plurality of L-shaped wall segments 202 spaced from each other to define a cross-shaped cavity 204. In an exemplary embodiment, four wall segments 202 are provided and arranged in four different quadrants. The wall segments 202 oppose each other across the cross-shaped cavity 204.

In an exemplary embodiment, the cross shaped cavity 204 is defined by a first cavity segment 206 and a second cavity segment 208 perpendicular to and intersecting the first cavity segment 206. The strip busbar 138 (shown in FIG. 2) is configured to be received in either of the first cavity segment 206 or the second cavity segment 208. The cross terminal 140 is configured to be coupled to the strip busbar 138 at different orthogonal orientations by loading the strip busbar 138 into the first cavity segment 206 or into the second cavity segment 208. The cross terminal 140 may thus be oriented at a zero degree position, a 90 degree position, a 180 degree position or a 270 degree position with respect to the strip busbar 138.

The cross terminal 140 includes a plurality of protrusions 210 extending into the cross shape cavity 204 from the wall segments 202. The protrusions 210 are configured to engage the strip busbar 138 when the strip busbar 138 is loaded into the cross shaped cavity 204. In the illustrated embodiment the protrusions 210 are defined by semicircular bumps extending into the cross shaped cavity 204 from the wall segments 202, however the protrusions 210 may have other shapes in alternative embodiments. The protrusions may be deflectable beams stamped out of the wall segments 202.

The cross terminal 140 includes open sides 212, 214, 216, 218 extending between a first end 220 and a second end 222 of the cross terminal 140. In an exemplary embodiment, the open sides 212, 214, 216, 218 are open along at least a portion of the length of the cross terminal 140 between the first and second ends 220, 222. Connecting segments 224 extend between corresponding wall segments 202 across the sides 212, 214, 216, 218. The sides 212, 214, 216, 218 may be closed at the location of the connecting segments 224. Optionally, the connecting segments 224 may be approximately centrally located along the sides 212, 216 such that the sides 212, 216 are open at the first and second ends 220, 222. Optionally, as shown in FIG. 4, the connecting segments 224 may extend to the second end 222 along the sides 214, 218, such that the sides 214, 218 are only open proximate to the first end 220 and are closed proximate to the second end 222.

In an exemplary embodiment, the body 200 is stamped and formed such that an overlap segment 226 extends from one wall segment 202, across the side 218, and along the opposed wall segment 202. The overlap segment 226 holds the cross terminal 140 together. Alternatively, rather than using the overlap segment 226, one or more wall segments 202 may be secured to other wall segment(s), such as by laser welding the wall segments 202 together.

In the illustrated embodiment, the cross terminal 140 is open at all four sides 212, 214, 216, 218 at the first end 220, while, at the second end 222, only being open at two sides 212, 216 and closed at the other two sides 214, 218. Alternatively, the second end 222 of cross terminal 140 may be identical as the first end of cross terminal 140, being open at all four sides 212, 214, 216, 218. In other alternative embodiments, the first end 220 may be closed at any of the sides 212, 214, 216, 218, such as at the sides 214, 218 in a similar manner as the second end 222 while the second end 222 of cross terminal 140 may be identical as the first end 220 of the cross terminal 140, being open at all four sides 212, 214, 216, 218. In other alternative embodiments, the first end 220 of cross terminal 140 may be identical as the second end of cross terminal 140, being open at two sides 212, 216 such that both the first and second ends 220, 222 have two open sides and two closed sides The ends 220, 222 may have any number of open sides and closed sides depending on the particular application. In other alternative embodiments, the first end 220 of the cross terminal 140 may be closed at all four sides, such as when at least one blade is branched out from the vertical strip bussbar 138, while the second end 222 of the cross terminal 140 may have any number of open sides and closed sides.

In an alternative embodiment, the cross terminal 140 may include additional wall segments and additional cavity segments (e.g. 3 or more cavity segments) allowing additional mounting orientations of the cross terminal 140 relative to the strip busbar 138 and the electronic device 136 (e.g. parallel, perpendicular and transverse/non-parallel and non-perpendicular). The cross shaped cavity in such embodiments would no longer be perpendicular cross-shaped but rather would have many crossing cavity segments.

Figure 5:
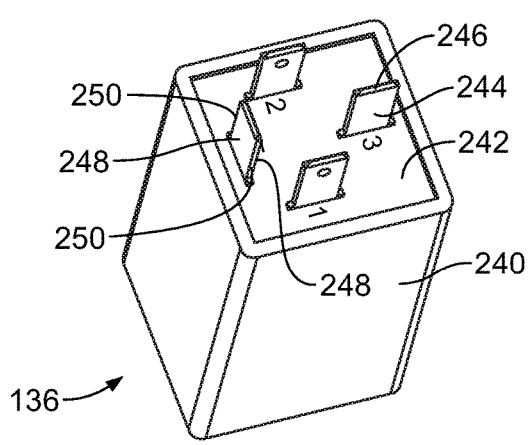
FIG. 5 is a bottom perspective view of an electronic device of the battery distribution unit.

FIG. 5 is a bottom perspective view of one of the electronic devices 136. The electronic device 136 includes a body 240 having a bottom 242. A plurality of blade terminals 244 extend from the bottom 242. The blade terminals 244 are configured to be terminated to corresponding cross terminals 140 (shown in FIGS. 3 and 4) or to other types of socket terminals. The blade terminals 244 are planar and extend to a tip 246. The blade terminals 244 have opposing sides 248 extending between opposing edges 250.

Figure 6:
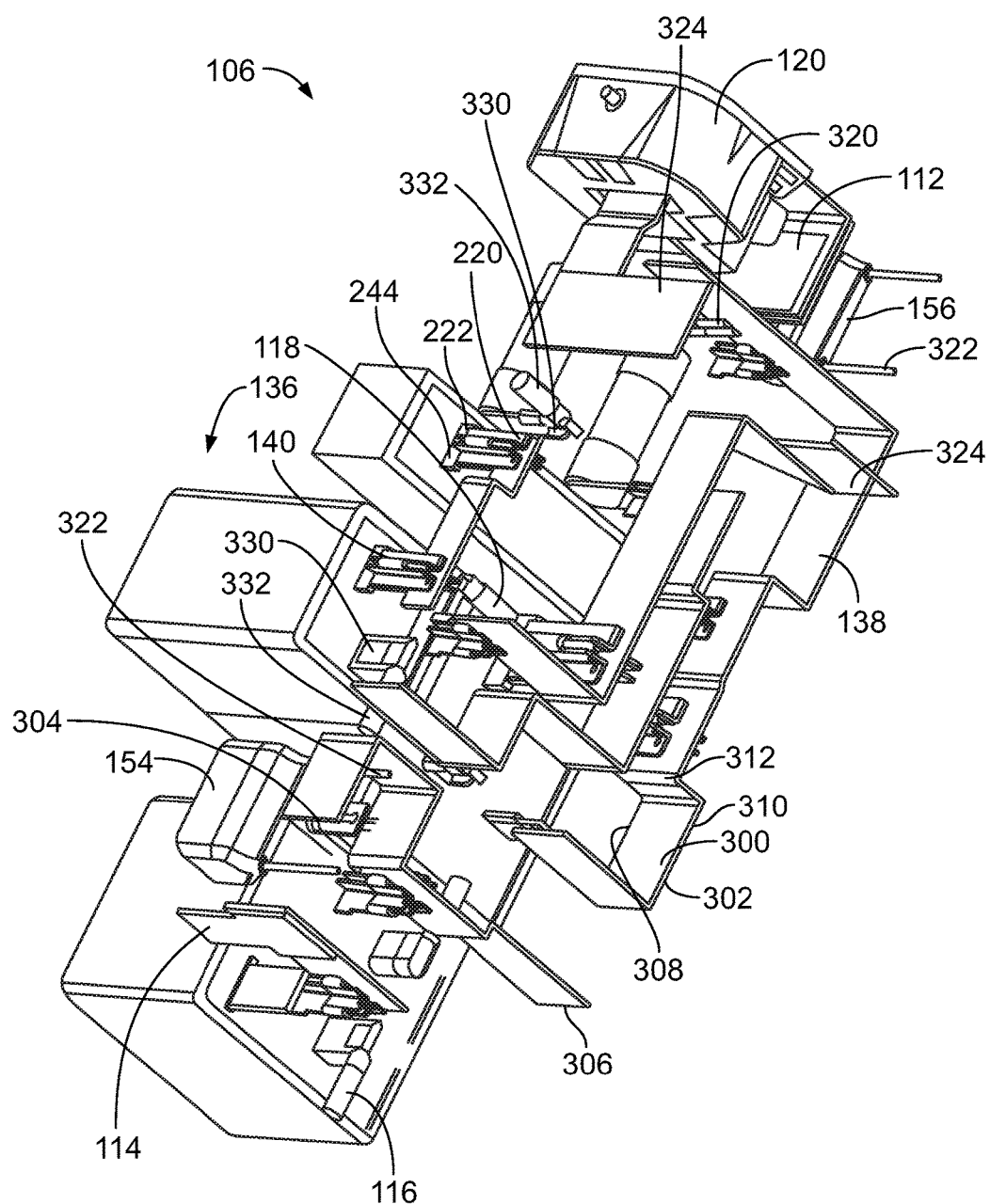
FIG. 6 illustrates electrical components of the battery distribution unit.

FIG. 6 illustrates electrical components of the BDU 106 (shown in FIG. 2) with the BDU housing 108 (shown in FIG. 2) removed for clarity. FIG. 6 illustrates the strip busbars 138 electrically interconnecting corresponding electronic devices 136 in accordance with a particular powering scheme for the BDU 106. In an exemplary embodiment, each strip busbar 138 is formed from a metal coil strip cut to length and bent into a predetermined shape to route between, and electrically connect to, corresponding electronic devices 136 via the cross terminals 140. The strip busbar 138 may have a rectangular cross-section along the entire length thereof.

The strip busbar 138 includes first and second broad sides 300, 302 extending a length of the strip busbar 138 between first and second ends 304, 306. The strip busbars 138 may have different lengths between the first and second ends 304, 306 thereof. The strip busbar 138 has a top edge 308 and a bottom edge 310 extending between the first and second ends 304, 306. The strip busbars 138 may have any number of bends 312 between the first and second ends 304, 306. Optionally, the bends 312 may be 90 degree bends. Alternatively, the bends 312 may be at other angles such that the segments on opposite sides of the bends 312 are non-perpendicular.

The strip busbars 138 are routed through the BDU 106 to electrically interconnect different electronic devices 136 or other components of the BDU 106 or battery system 100 (shown in FIG. 1). The strip busbars 138 pass vertically below corresponding blade terminals 244 of the electronic devices 136 such that the cross terminals 140 may electrically connect the strip busbars 138 with the corresponding blade terminals 244. Optionally, the strip busbars 138 may be parallel to the blade terminals 244 (e.g., having the broad sides 300, 302 parallel to the sides 248), or alternatively, the strip busbars 138 may be oriented perpendicular to the blade terminals 244 (e.g., having the broad sides 300, 302 perpendicular to the sides 248).

The crossed shaped cavities 204 of the cross terminals 140 allow the strip busbars 138 to pass through the cross terminals 140 at different orthogonal orientations (e.g., parallel or perpendicular) to the blade terminals 244. The second ends 222 of the cross terminals 140 are coupled to the corresponding blade terminals 244 while the first ends 220 of the cross terminals 140 receive corresponding strip busbars 138. Because the second ends 222 have two open sides 212, 216, the cross terminals 140 are configured to be coupled to the blade terminals 244 in either a zero degree position or 180 degree position such that the blade terminals 244 are received in the first cavity segment 206 (shown in FIG. 3). The edges 250 extend beyond the sides 212, 216 of the cross terminals 140. In such orientation relative to the blade terminal 244, the four open sides 212, 214, 216, 218 (shown in FIG. 3) of the cross terminals 140 are capable of receiving the strip busbars 138 in either the first cavity segment 206 or the second cavity segment 208 (shown in FIG. 3). When the strip busbar 138 is parallel to the blade terminal 244, the strip busbar 138 is received in the first cavity segment 206. When the strip busbar 138 is perpendicular to the blade terminal 244, the strip busbar 138 is received in the second cavity segment 208. Having open sides allows flexibility in the positioning of the strip busbars 138 and the electronic devices 136. The cross terminals 140 have greater position tolerance relative to the strip busbars 138 and/or the electronic devices 136 as compared to cross terminals 140 that have four closed sides at the first or second end thereof. The design and the layout of the strip busbars 138 and electronic devices 136 within the BDU 106 may be easier using open sided cross terminals 140.

In an alternative embodiment, the cross terminals 140 may be flipped 180° such that the first ends 220 are coupled to the blade terminals 244 and the second ends are coupled to the strip busbars 138. Because the second ends 222 are only open along the two sides 214, 218, the cross terminal 140 may only be received in the first cavity segment 206; however the first end 220 may receive the blade terminal 244 in either the first cavity segment 206 or in the second cavity segment 208 such that the blade terminal 244 may be either parallel to the strip busbar 138 or perpendicular to the strip busbar 138.

The cross terminals 140 electrically connect the strip busbars 138 and corresponding blade terminals 244. Optionally, the strip busbars 138 may be electrically connected to other components in addition to one or more electronic devices 136. For example, the strip busbars 138 may be connected to the positive or negative battery terminals 112, 114, the sensor connector of shunt type senor or passed through a Halls sensor 120, the Y-capacitors 154, 156, electrical take offs 320, or other components. In an exemplary embodiment, first wires 322 extending from the Y-capacitors 154, 156 are directly connected to the corresponding strip busbars 138, such as by soldering or welding the wires 322 to the strip busbars 138. Second wires extending from the Y-capacitors 154, 156 are directly connected to external wires (not shown), such as by soldering or welding the wires to the external wires.

Optionally, the first or second ends 304, 306 of the strip busbars 138 may be folded over to define tabs 324. The tabs 324 may be directly connected to other electrical components, such as directly to battery cells 124 (shown in FIG. 1), directly to the MSD 122 if the MSD is located proximate to the lower housing 132 (shown in FIG. 2), or other components. The tabs 324 may extend beyond the BDU housing 108 for termination to such other electrical components. Optionally, the tabs 324 may define the positive and negative battery terminals 112, 114 as opposed to having separate battery terminals welded to the strip busbars 138.

The electrical take offs 320 may be connected to the strip busbars 138 along any segment thereof. For example, the electrical take offs 320 may include open sided terminals attached to wires. The open sided terminals are coupled to the strip busbars 138 along either the top edge 308 or the bottom edge 310. The wires terminated to the electrical take offs 320 may extend to other electrical components within the BDU 106 or outside of the BDU 106. The electrical take off 320 may conduct power or may be used for voltage measuring or other functions.

In an exemplary embodiment, blade contacts 330 are coupled to at least some of the blade terminals 244 of the electronic devices 136. The blade contacts 330 may be terminated to wires 332 that are routed within the BDU 106 and/or outside of the BDU 106. Optionally, the wires 332 may define one or more of the high voltage wires 116 (shown in FIG. 1) or the low voltage wires 118 (shown in FIG. 1) that are routed from the BDU 106 to other components of the battery system 100.

Figure 7:
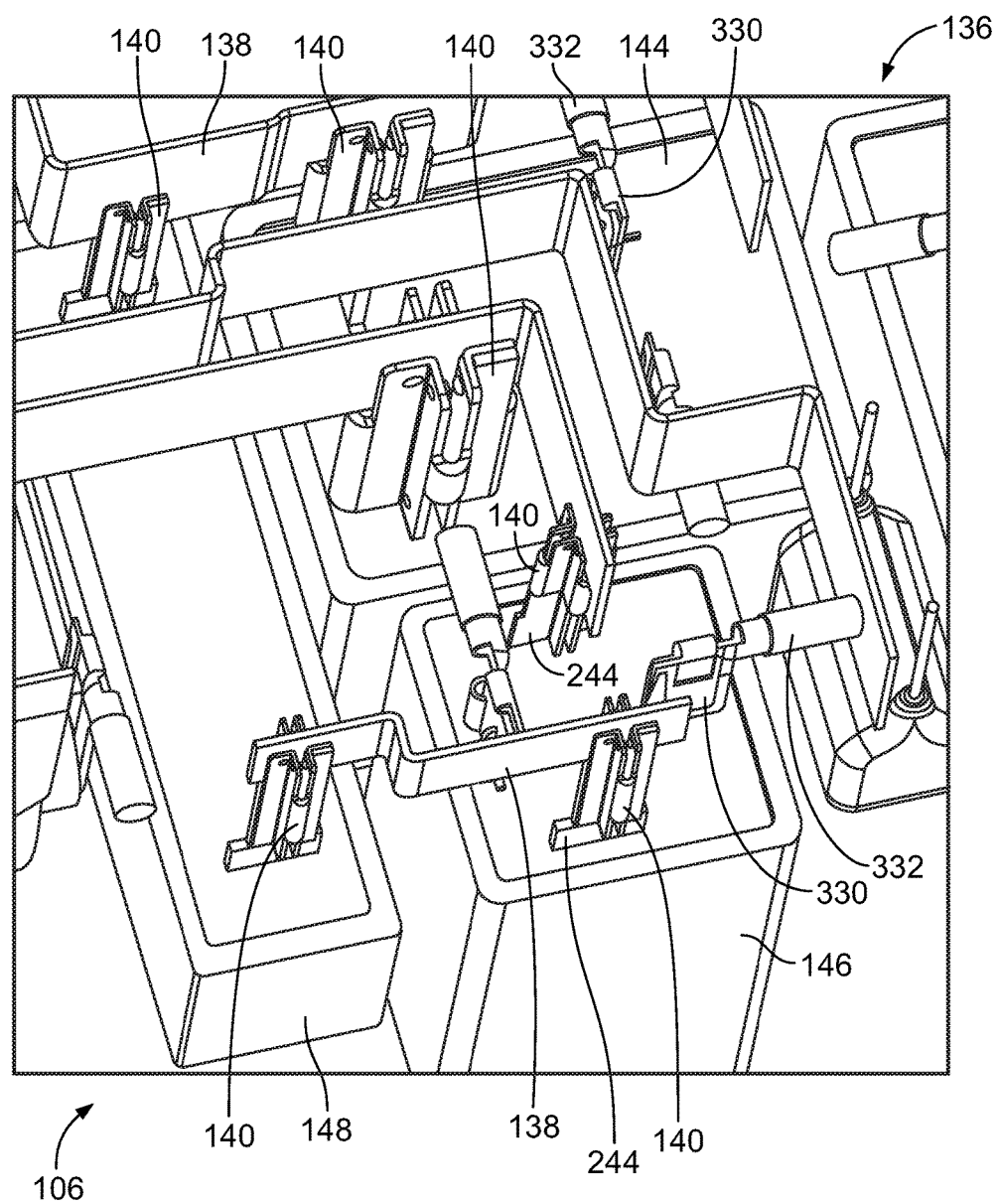
FIG. 7 is an enlarged view of a portion of the battery distribution unit.

FIG. 7 is an enlarge view of a portion of the BDU 106. FIG. 7 illustrates strip busbars 138 connecting the precharge relay 146 with the pre-charge resister 148 using corresponding cross terminals 140. FIG. 7 also illustrates the pre-charge relay 146 connected to the power relay 144 using corresponding cross terminals 140. Blade contacts 330 and corresponding wires 332 are connected to corresponding blade terminals 244 of the pre-charge relay 146 and power relay 144. Such wires 332 may be connected to other electrical components of the BDU 106. FIG. 7 illustrates portions of other electronic devices 136 and strip busbars 138. FIG. 7 illustrates the pre-charge relay 146 with one of the strip busbars 138 oriented perpendicular to the corresponding terminal blade 244 and with another strip busbar 138 oriented parallel to the corresponding terminal blade 244. The second ends 222 of the cross terminals 140 receive the blade terminals 244 and the first ends 220 of the cross terminals 140 receive the strip busbars 138. The strip busbars 138 are flexible in design to allow routing schemes within the BDU 106 to reduce the overall size or footprint of the BDU 106.

Figure 8:
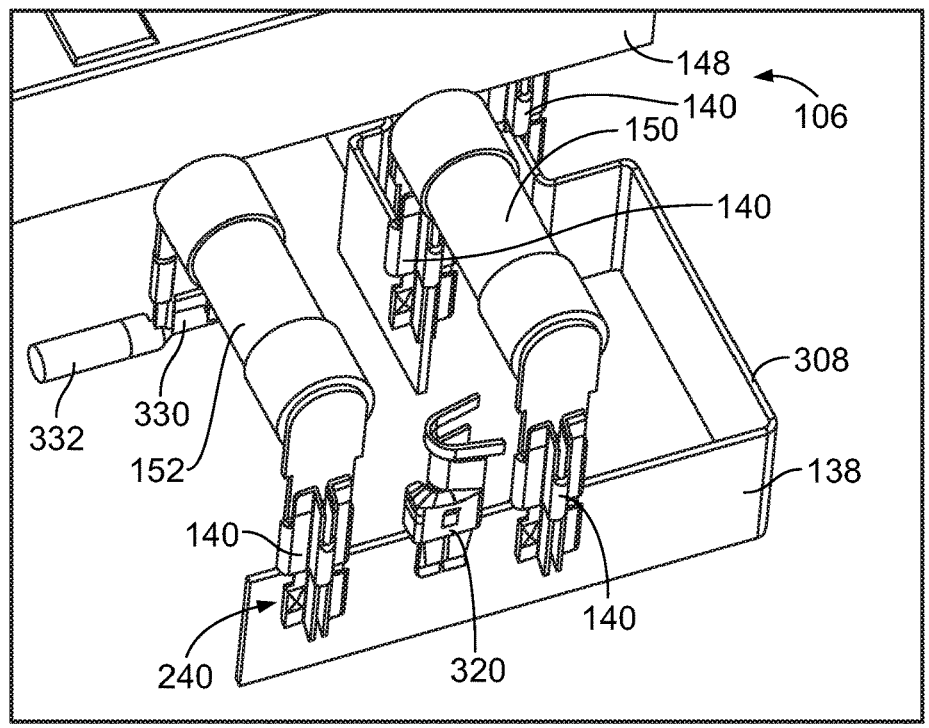
FIG. 8 illustrates a portion of the battery distribution unit.

FIG. 8 illustrates a portion of the BDU 106. FIG. 8 shows the pre-charge resister 148 being electrically connected to the fuses 150, 152 via corresponding cross terminals 140. The fuse 150 is electrically connected to another strip busbar 138 by a corresponding cross terminal 140. The fuse 152 is connected to a corresponding blade contact 330, where the corresponding wire 332 may be electrically connected to another electrical component within the BDU 106 or exterior of the BDU 106. FIG. 8 illustrates a power take off 320 coupled to the top edge 308 of the strip busbar 138. The electrical take off 320 may be connected to another component, such as an accessory, a DC/DC inverter, a voltage sensor or another electrical component within the BDU 106 or exterior of the BDU 106. For example, as illustrated in FIG. 1, the high voltage wires 116 and/or the low voltage wires 118 exit from the side of BDU housing 108.

In the illustrated embodiment, the cross terminals 140 are connected to the strip busbar 138 along the top edge 308 of the strip busbar 138. The top edge 308 is received in the cross shaped cavity 204 of the cross terminals 140.

Figure 9:
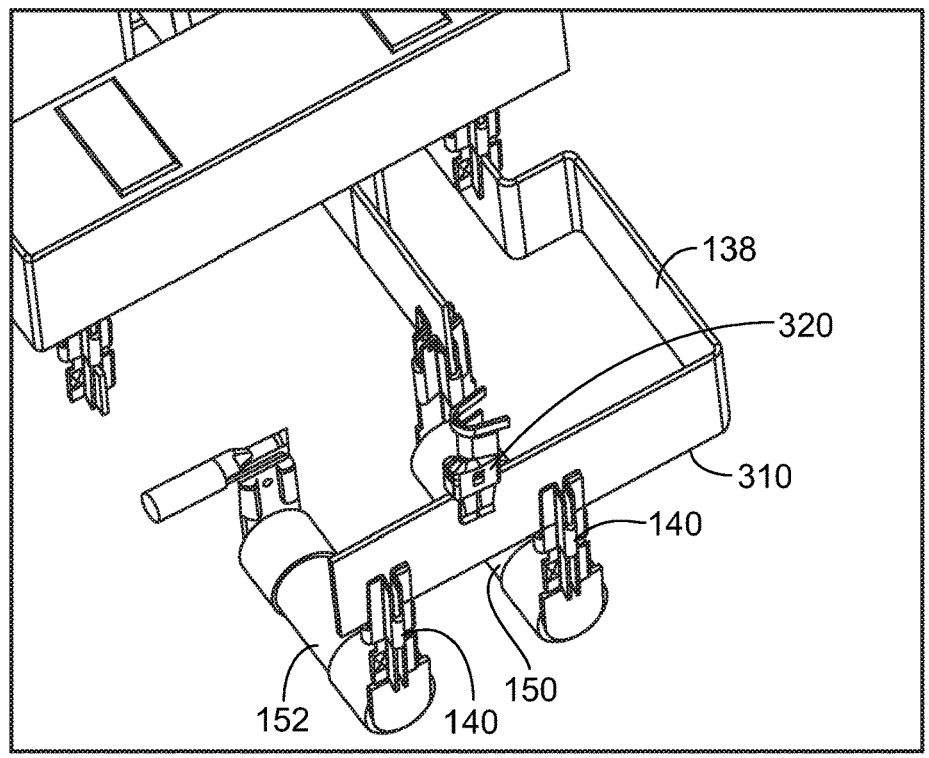
FIG. 9 illustrates a portion of the battery distribution unit.

FIG. 9 illustrates a portion of BDU 106 showing one of the strip busbars 138 electrically connected to the pre-charge resister 148 and the fuses 150, 152 via the corresponding cross terminals 140. In the illustrated embodiment, the cross terminals 140 are connected to the bottom edge 310 of the strip busbar 138. The fuses 150, 152 are positioned below the strip busbar 138. Optionally, the fuses 150, 152 may be positioned below the bottom 162 (shown in FIG. 2) of the lower housing 132 (shown in FIG. 2), such as for access from an exterior of the BDU housing 108 (shown in FIG. 2).

Figure 10:
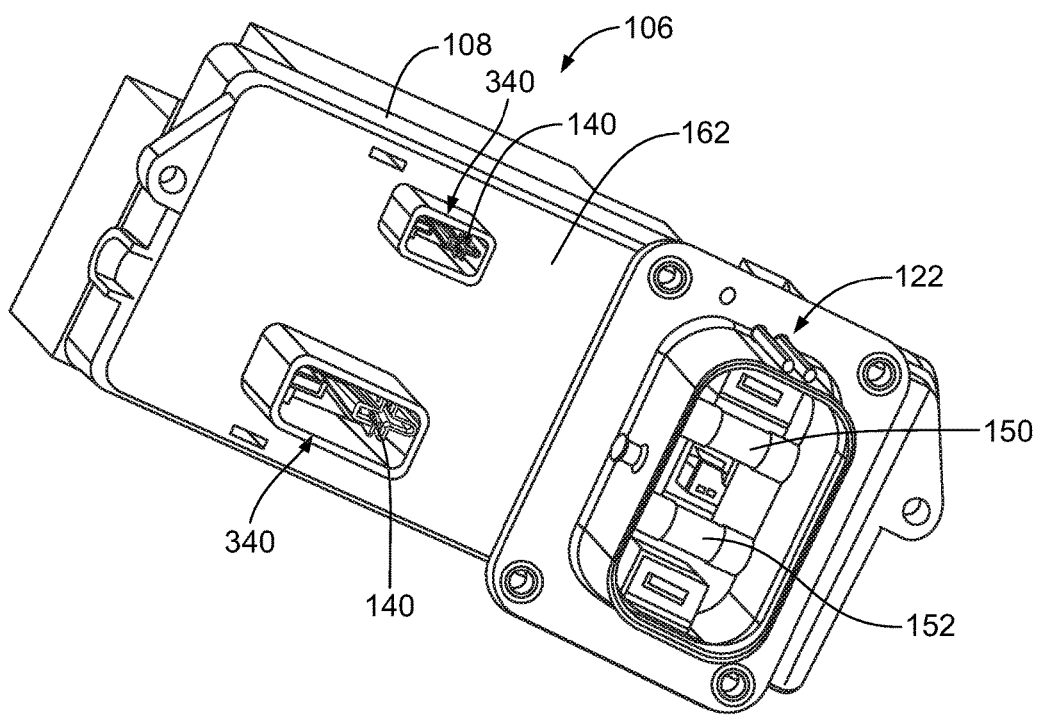
FIG. 10 is a bottom perspective view of the battery distribution unit.

FIG. 10 is a bottom perspective view of the BDU 106 in accordance with an alternative embodiment showing the bottom 162 of the BDU housing 108. In the embodiment illustrated in FIG. 10, the MSD 122 is illustrated connected to the bottom 162 of the BDU housing 108. The fuses 150, 152 are located within the MSD 122. The fuses may not need additional wires connected thereto, which are routed from the BDU housing 108. The fuses 150, 152 may be covered by the plug of the MSD 122 when the plug of the MSD 122 is coupled to the header of the MSD 122. When the plug is removed, the fuses 150, 152 are exposed for servicing and replacing.

The BDU 106 includes external connectors 340 along the bottom 162 for electrical connection to other mating connectors (not shown). Cross terminals 140 are positioned within the external connectors 340 for connections to the mating connectors. The cross terminals 140 are configured to be coupled to corresponding strip busbars 138 along the bottom edges 310 (both shown in FIG. 7) of the strip busbars 138. The cross terminals 140 are positioned to an exterior of the BDU 106 for mating with the mating connectors.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. § 112, sixth paragraph, unless and until such claim limitations expressly use the phrase "means for" followed by a statement of function void of further structure.

What is claimed is:

1. A battery distribution unit (BDU) configured to hold a first electronic device having a first blade terminal extending therefrom and a second electronic device having a second blade terminal extending therefrom, the BDU comprising:
   a BDU housing;
   a strip busbar received in the BDU housing, the strip busbar includes a top edge and a bottom edge extending a length of the strip busbar between first and second ends, the strip busbar having first and second broad sides extending between the top edge and the bottom edge; and first and second cross terminals received in the BDU housing, the first cross terminal receiving the strip busbar at a first end thereof such that a mating interface of the first cross terminal engages one of the first broad side or the second broad side of the strip busbar between the top edge and the bottom edge and the first cross terminal being configured to receive the first blade terminal at a second end thereof, the second cross terminal receiving the strip busbar at a first end thereof such that a mating interface of the second cross terminal engages one of the first broad side or the second broad side of the strip busbar between the top edge and the bottom edge and the second cross terminal being configured to receive the second blade terminal at a second end thereof.

2. The BDU of claim 1, the strip busbar having at least two bends along the lengths.

3. The BDU of claim 1, wherein the first and second cross terminals being mounted to either of the first or second edges at any positions along the length, the first and second cross terminals engaging both the first and second broad sides.

4. The BDU of claim 1, wherein the strip busbar is formed from a metal coil strip cut to length and bent into a predetermined shape to electrically connect the first and second blade terminals via the first and second cross terminals.

5. The BDU of claim 1, wherein the strip busbar has a rectangular cross section along an entire length thereof defined by the opposite broad sides, the cross terminals being mounted onto either the top edge or the bottom edge to engage both broad sides.

6. The BDU of claim 1, wherein the first and second cross terminals include L shaped wall segments arranged in four quadrants, the L shaped wall segments defining a cross shaped cavity configured to receive the strip busbar.

7. The BDU of claim 1, wherein the first and second cross terminals each include a crossed shaped cavity having a first cavity segment and a second cavity segment perpendicular to and intersecting the first cavity segment, the first and second cross terminals being coupled to the strip busbar at different orthogonal orientations by loading the strip busbar into the first cavity segment or into the second cavity segment of the corresponding first or second cross terminal.

8. The BDU of claim 1, wherein the first and second cross terminals have open sides at both first ends and second ends thereof allowing the strip busbar and corresponding first and second blade terminal to pass through the open sides.

9. The BDU of claim 1, wherein the BDU housing includes a channel and chambers open to a channel, the strip busbar received in the channel, the first and second cross terminals received in corresponding chambers to mechanically and electrically connect to the strip busbar.

10. The BDU of claim 1, further comprising a second busbar and a third cross terminal, the third cross terminal receiving the second strip busbar at a first end thereof and being configured to receive a third blade extending from the second electronic device such that both the strip busbar and the second strip busbar are electrically connected to the second electronic device.

11. The BDU of claim 1, wherein the first end includes at least four open sides.

12. A battery distribution unit (BDU) configured to hold a first electronic device having a first blade terminal extending therefrom and a second electronic device having a second blade terminal extending therefrom, the BDU comprising:

a BDU housing having an upper housing configured to hold the first and second electronic devices and a lower housing, the lower housing having a top and a bottom, the lower housing having channels extending vertically between the top and the bottom, the lower housing having chambers open to the channels;

strip busbars received in corresponding channels in the lower housing; and first and second cross terminals received in corresponding chambers in the lower housing, the first cross terminal including a cavity and a protrusion extending into the cavity, the first cross terminal receiving the strip busbar in the cavity at a first end thereof, the protrusion engaging the strip busbar, the first cross terminal being configured to receive the first blade terminal in the cavity at a second end thereof, the second cross terminal including a cavity and a protrusion extending into the cavity, the second cross terminal receiving the strip busbar in the cavity at a first end thereof, the protrusion engaging the strip busbar, the second cross terminal being configured to receive the second blade terminal in the cavity at a second end thereof.

13. The BDU of claim 12, wherein the strip busbar includes first and second broad sides extending a length of the strip busbar between first and second ends, the strip busbar having a top edge and a bottom edge extending between the first and second ends, the strip busbar having at least two bends along the lengths.

14. The BDU of claim 12, wherein the strip busbar includes first and second broad sides extending a length of the strip busbar between first and second ends, the strip busbar having a top edge and a bottom edge extending between the first and second ends, the first and second cross terminals being mounted to either of the first or second edges at any positions along the length, the first and second cross terminals engaging both the first and second broad sides.

15. The BDU of claim 12, wherein the strip busbar is formed from a metal coil strip cut to length and bent into a predetermined shape to electrically connect the first and second blade terminals via the first and second cross terminals.

16. The BDU of claim 12, wherein the strip busbar has a rectangular cross section along an entire length thereof defined by opposite broad sides extending between a top edge and a bottom edge, the broad sides facing walls defining the channels, the cross terminals being mounted onto either the top edge or the bottom edge to engage both broad sides.

17. The BDU of claim 12, wherein the first and second cross terminals each include a crossed shaped cavity having a first cavity segment and a second cavity segment perpendicular to and intersecting the first cavity segment, the first and second cross terminals being coupled to the strip busbar at different orthogonal orientations by loading the strip busbar into the first cavity segment or into the second cavity segment of the corresponding first or second cross terminal.

18. The BDU of claim 12, wherein the first and second cross terminals have open sides at both first ends and second ends thereof allowing the strip busbar and corresponding first and second blade terminal to pass through the open sides.

19. The BDU of claim 12, wherein the channels and chambers are aligned vertically below the first and second electronic devices.

20. The BDU of claim 1, wherein the first cross terminal includes a cavity and a protrusion extending into the cavity, the first cross terminal receiving the strip busbar in the cavity at the first end such that the protrusion engages the first broad side or the second broad side of the strip busbar, and wherein the second cross terminal includes a cavity and a protrusion extending into the cavity, the second cross terminal receiving the strip busbar in the cavity at the first end thereof such that the protrusion engages the first broad side or the second broad side of the strip busbar.

* * * * *